United States Patent [19]

Mentzer et al.

[11] Patent Number: 4,915,286

[45] Date of Patent: Apr. 10, 1990

[54] METHOD FOR THE SOLDERING OF EXTERNAL CONNECTION WIRES TO AN ELECTRONIC COMPONENT

[75] Inventors: Régis Mentzer, Savigny-Le-Sec; Michel Henry, Marsannay-La-Cote, both of France

[73] Assignee: Compagnie Europeenne de Composants Electroniques LCC, Courbevoie, France

[21] Appl. No.: 377,417

[22] Filed: Jul. 10, 1989

[30] Foreign Application Priority Data

Jul. 13, 1988 [FR] France ................. 88 09546

[51] Int. Cl.⁴ .......................... B23K 1/20; B23K 35/14
[52] U.S. Cl. ................. 228/173.5; 228/179; 228/180.2; 228/255; 228/15.1; 228/56.3
[58] Field of Search ............ 228/136, 173.5, 179, 228/180.2, 210, 245, 255, 246, 15.1, 56.3; 29/238, 282, 505, 860; 72/57, 60

[56] References Cited

U.S. PATENT DOCUMENTS

| | | | |
|---|---|---|---|
| 3,220,098 | 11/1965 | Arbogast | 72/57 |
| 3,333,047 | 7/1967 | Geoffroi | 228/255 |
| 3,616,981 | 11/1971 | Dieteman et al. | 228/15.1 |
| 3,760,622 | 9/1973 | Mansell | 72/57 |
| 3,886,650 | 6/1975 | Cobaugh et al. | 228/255 |
| 4,785,988 | 11/1988 | Topel et al. | 228/255 |

FOREIGN PATENT DOCUMENTS 1665608 3/1971 Fed. Rep. of Germany .
1425595 2/1976 United Kingdom .

Primary Examiner—Nicholas P. Godici
Assistant Examiner—Samuel M. Heinrich
Attorney, Agent, or Firm—Oblon, Spivak, McClelland, Maier & Neustadt

[57] ABSTRACT

According to the disclosed method for the soldering of wires of components, at least one wire is stamped to make it lose its symmetry of revolution. The result thereof is one or more impressions. A solder strip is crimped by deformation around the wire to form a solder preform held still by the impressions, which leaves free a surface of the wire. The component to be soldered, held against said surface of the wire, is soldered by reflow process. Application: the soldering of components such as disk ceramic capacitors.

3 Claims, 1 Drawing Sheet

METHOD FOR THE SOLDERING OF EXTERNAL CONNECTION WIRES TO AN ELECTRONIC COMPONENT

BACKGROUND OF THE INVENTION

1. Field of the Invention

The present invention concerns a method for soldering lead-out wires to electronic components. It also concerns a component fitted with at least one external connection by metal wire soldered by the method of the invention.

2. Description of the Prior Art

Many components have their external connections made by means of metal wires, generally of copper, with a diameter of about 0.6 to 0.8 mm. These wires are used, firstly, to handle the component, and then, secondly, to fix it to a substrate or circuit. These functions are secondary with respect to the main function which is to provide electrical access to the component.

The fixing of these wires has to be mechanically strong, and must possess low electrical resistance and be convenient for the assembling method and economical at the same time.

Among known methods, the following are essentially used on an industrial scale:

dip soldering, in still baths or by wave soldering, reflow soldering either with a solder paste or with a surplus of tinning given to the connection wires.

Dip soldering does not give excellent industrial scale results because the component, subjected to an Archimedean thrust, when it is dipped in the molten solder bath, gets moved with respect to its connection wires.

Soldering with solder paste is costly. Finally, reflow soldering by reflow of surplus tinning on the wires is imprecise: when the tinning of the wires melts, the component is not properly held in place since there is a liquid film between the component and the connection wire.

The invention enables the elimination of these drawbacks and facilitates the soldering of the wires to a component with perfectly localized soldering, at low cost, and gives a well-positioned component. The method according to the invention consists in providing the end of a connection wire, to be soldered on a component, with a solder preform. This preform does not completely surround the lead-out wire so that this wire can be in direct contact with the component on which it leans. The wire is deformed locally beforehand, to remove its axis of symmetry and prevent the rotation of the solder preform around the wire. The solder on the component of the wire thus coated is done by reflow process.

SUMMARY OF THE INVENTION

More precisely, the invention concerns a method for the soldering of external connection wires to an electronic component provided with surfaces that can be soldered, wherein the sequence of the following operations is performed:

(a) At least one connection wire is stamped at its end to be soldered, to give it a dissymetry of revolution.

(b) A solder strip is crimped on the deformed end of the wire with deformation of said strip so as to make a solder preform from it, leaving a portion of the surface of the wire exposed;

(c) The component to be soldered is presented against the wire provided with its solder preform with the surface, capable of being soldered, of the component facing that part of the wire which is not coated with the solder preform;

(d) Fluxing and soldering by reflow process.

BRIEF DESCRIPTION OF THE DRAWINGS

The invention will be better understood from the following more detailed description of the embodiment, based on the appended figures, all relating to the invention, of which.

For greater clarity and more precision, the invention will be explained on the basis of an example of a disk-shaped ceramic capacitor. This does not limit the scope of the invention, which is applicable to the soldering of any external connection wire to a component.

DESCRIPTION OF A PREFERRED EMBODIMENT

Figure 1:
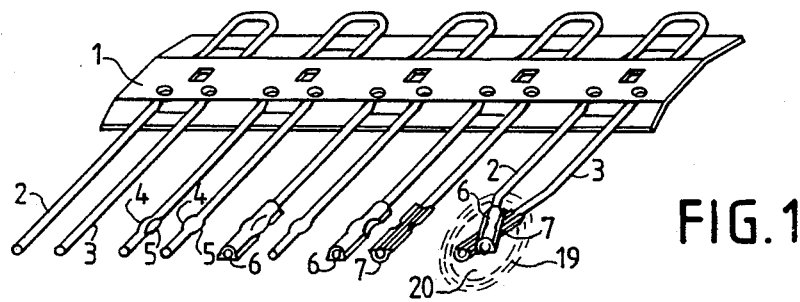
FIG. 1 shows a three-quarter view, in space, of a strip of connection wires.

It is known that ceramic disk capacitors are manufactured by industrial batch production methods: FIG. 1 shows an element of a strip of capacitors, with the different steps of the soldering method for each pair of wires.

A suitably perforated cardboard strip 1 supported by a plurality of pins made of metal wire, typically made of copper, with a diameter of about 0.5 mm and rigid, so that two connection wires 2 and 3 are parallel on one side of the strip. These wires are generally round sectioned.

The first step of the method consists in stamping these wires so as to deform them in order to make them lose their symmetry of revolution, on the end which will receive a solder preform. This stamping prevents the preform from rotating on the wire, and imposes a determined position on it.

Figure 2B:
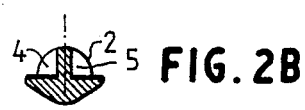
FIG. 2 gives detailed, sectional and plane views of a deformed connection wire.
Figure 2A:
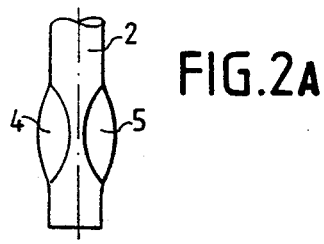

FIG. 2 shows an enlarged detailed view of the stamped end of the wire 2. In the example shown, the wire has been stamped by means of two cylindrical punches which have left impressions 4 and 5, but the wire could also comprise a local, spatula-shaped, flattening or a series of cuts which make it lose its symmetry of revolution. However, the reasons that make this stamping shape advantageous shall be seen further below.

The stamping of the connection wires 2 and 3 is done in a well-determined direction. For example, for a disk capacitor with two lead-out connections, a first wire is stamped on top of the plane defined by the strip 1 and a sheet of wires 2-3, and a second wire 3 is stamped beneath this very plane, so that the two stampings face each other and subsequently participate in a clamp which will keep the component in position during the reflow process.

Each of the connection wires 2 and 3 is then provided with a solder preform 6 and 7 which partially coats the copper wire, but leaves a generatrix of this wire free.

Figure 3B:
FIG. 3 shows detailed sectional and plane views of a connection wire provided with a solder preform.
Figure 3A:
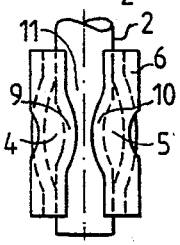
Figure 3C:
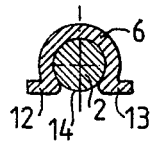

The shape of this solder preform is specified in detail in FIG. 3. The copper wire 2 is crimped in a sheath of solder 6, which can neither slide along the wire nor rotate on it because of the stamping impressions 4 and 5. Between the impressions, there remains a non-deformed part 8 of the wire 2, and the preform, by deformation, penetrates the impressions 4 and 5, and, at 9 and 10, grips the non-deformed part 8 of the wire without, however, going over on the external surface 11 of said part 8.

The soldering preform 6 is longer than the zone of the wire 2 deformed by the impressions 4 and 5 so that, in the part of the wire external to the impressions, the preform 6 has an omega-shaped section, with two fins 12 and 13 which are in the plane of a generatrix 14 of the wire 2. This generatrix 14 is itself identical with the external plane 11 of the non-deformed part 8 of the wire 2.

It is thus seen that the soldering preform 6 leaves exposed a part of the surface of the wire 2. It is by this part that the wire is supported on the component and holds it. During the reflow of the solder, the component will always be in contact with the connection wire, and there will be no liquid solder film between the component and the wire, as is the case with pre-tinned connections.

It has been stated that the stamping on the wires 2 and 3 are done in two opposite directions. Consequently, the preform 6 on the wire 2 and the perform 7 on the wire 3, leave exposed two opposite parts of the wires 2 and 3. These two exposed parts grip the disk of the capacitor by its two main faces.

Figure 4:
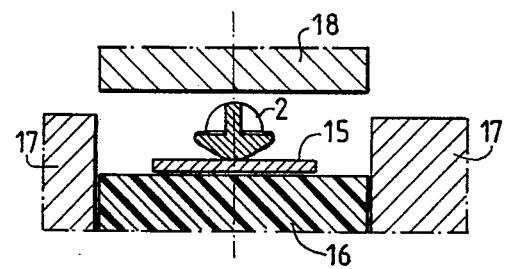
FIGS. 4 to 6 show schematized views, seen sectionally, of the tool and the method for the winding of a solder preform on a connection wire.
Figure 5:
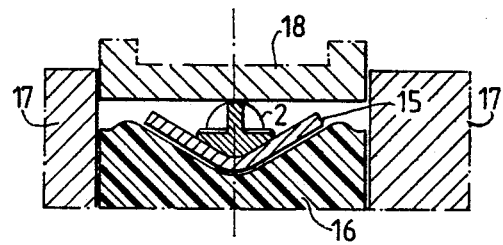
Figure 6:
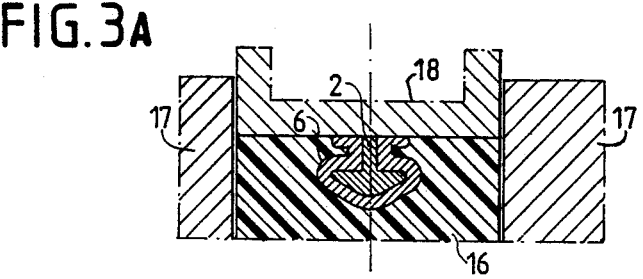

The laying of a solder preform 6 on a stamped wire 2 is done very simply and is explained by FIGS. 4 to 6.

A piece 15 of solder strip is laid on a matrix 16 made of deformable elastic material, such as a polyurethane block, for example, held in a jaw 17. The stamped end of the wire 2 is laid on this piece of strip 15, in a properly symmetrical position with respect to its longitudinal axis. A metallic punch 18, preferably guided by the jaw 17, pushes the wire 2 into the matrix 16 which makes the strip 15 run around the wire. When the punch 18 is lifted, the wire 2 is coated with a solder preform 6 which matches, at 9 and 10, the impressions 4 and 5 of the wire, and which forms, at 12 and 13, two fins which, by the action of the punch 18, are in the plane of the surface 14 of the non-stamped wire.

This operation, which is very simple, only requires the piece of strip 15 to have a thickness of the order of 0.2 mm, which is small as compared with its length, thus enabling its deformation as shown in FIGS. 5 and 6. The width of the strip 15 is about that of the circumference of the wire 2. The smaller the diameter of the wire, the smaller is the thickness chosen for the solder strip.

The rest of the operations use known techniques. In FIG. 1, a component 19, such as a ceramic capacitor disk, provided on each face with a metallization 20 capable of being subjected to soldering, is introduced between the two previously folded ends of the wires 2 and 3, provided with their solder preforms 6 and 7. The component is shown therein with dashes in order to let the connection wires be seen.

The set is coated with flux, for example by being dipped in a foamy flux bath, and then subjected to reflow soldering by passing through a continuous furnace, which is preferably vertical to ensure the evenness of the solders on both sides.

The shape of the impressions 4 and 5 and that of the fins 12 and 13 of the preforms 6 is such that, during the soldering, the component is, at all times properly held by the surfaces 11 and 14 by each of the two wires.

The soldering method according to the invention has many advantages:

the deposition of the solder is perfectly localized, the quantity of solder is well controlled, the fluxing is separate from the solder operation and, consequently, it is possible to act independently on the nature of the flux and on the nature of the solder, the cost price of the solder is minimum, during the solder melting phase, the disk undergoes no external mechanical stresses. Its centering between the wires remains accurate.

the method lends itself to automation.

What is claimed is:

1. A method for the soldering of external connection wires to an electronic component provided with surfaces that can be soldered, wherein the sequence of the following operations is performed:
   (a) at least one connection wire is stamped at its end to be soldered, to give it a dissymmetry of revolution.
   (b) a solder strip is crimped on the deformed end of the wire with deformation of said strip so as to make a solder preform from it, leaving a portion of the surface of the wire exposed;
   (c) the component to be soldered is presented against the wire provided with its solder preform, the surface, capable of being soldered, of the component, facing that part of the wire which is not coated with the solder preform;
   (d) Fluxing and soldering by reflow process.

2. A soldering method according to claim 1, wherein the stamping of the end to be soldered of at least one connection wire enables the solder preform to be positioned with precision, without rotation on the wire, and enables the preservation of a surface for the direct supporting of the wire on the component to be soldered.

3. A soldering method according to claim 1, wherein the crimping of a solder preform on a connection wire comprises the following operations:
   (a) On a matrix made of deformable and elastic material, the deposition of a piece of solder strip, with a width substantially equal to the circumference of the wire and a thickness that is smaller than the width;
   (b) The deposition of the stamped end of the connection wire on the solder strip along its axis of symmetry;
   (c) The deformation of the strip by means of a punch which, in leaning on the wire, imprints the strip in the deformable matrix which causes the strip to run against the impressions of the wire and forms a solder preform, the surface of the wire in contact with the punch remaining free of solder metal.

* * * * *